United States Patent
Pinaton et al.

[11] Patent Number: 6,141,103
[45] Date of Patent: Oct. 31, 2000

[54] MONITORING METHOD OF AN ION IMPLANTATION PROCESS

[75] Inventors: Jacques Pinaton, Assas; Olivier Diop; Pascal Lambert, both of Aix en Provence, all of France

[73] Assignee: STMicroelectronics S.A., Gentilly, France

[21] Appl. No.: 09/271,038

[22] Filed: Mar. 17, 1999

[30] Foreign Application Priority Data

Mar. 18, 1998 [FR] France ................................. 98 03560

[51] Int. Cl.$^7$ ............................................. G01J 4/00
[52] U.S. Cl. ................................................... 356/369
[58] Field of Search ................................. 356/369, 364, 356/367, 368, 381, 382, 72–73, 351, 355; 250/225

[56] References Cited

U.S. PATENT DOCUMENTS

| | | |
|---|---|---|
| 5,329,357 | 7/1994 | Bernoux et al. .......................... 356/369 |
| 5,666,200 | 9/1997 | Drevillon et al. ....................... 356/368 |

FOREIGN PATENT DOCUMENTS

| | | | |
|---|---|---|---|
| 0 768 512 A2 | 4/1997 | European Pat. Off. ........ | G01B 11/06 |

OTHER PUBLICATIONS

Vanhellemont et al., *Materials Science & Engineering*, B5 (1990) Jan., No. 2, "Spectroscopic Ellipsometry Characterization of Silicon–on–insulator Materials", pp. 301–307, May, 1989.

*Primary Examiner*—Frank G. Font
*Assistant Examiner*—Michael P. Stafira
*Attorney, Agent, or Firm*—Theodore E. Galanthay; Allen, Dyer, Doppelt, Milbrath & Gilchrist, P.A.

[57] ABSTRACT

A method is to characterize a process of ion implantation and includes a step of the measurement, by a spectroscopic ellipsometer, of the ellipsometric parameters (tan$\psi$, cos$\delta$) of a film of organic resin present on the surface of a wafer that has received ion bombardment. The film of resin includes at least one upper layer of carbonized or damaged resin.

32 Claims, 7 Drawing Sheets

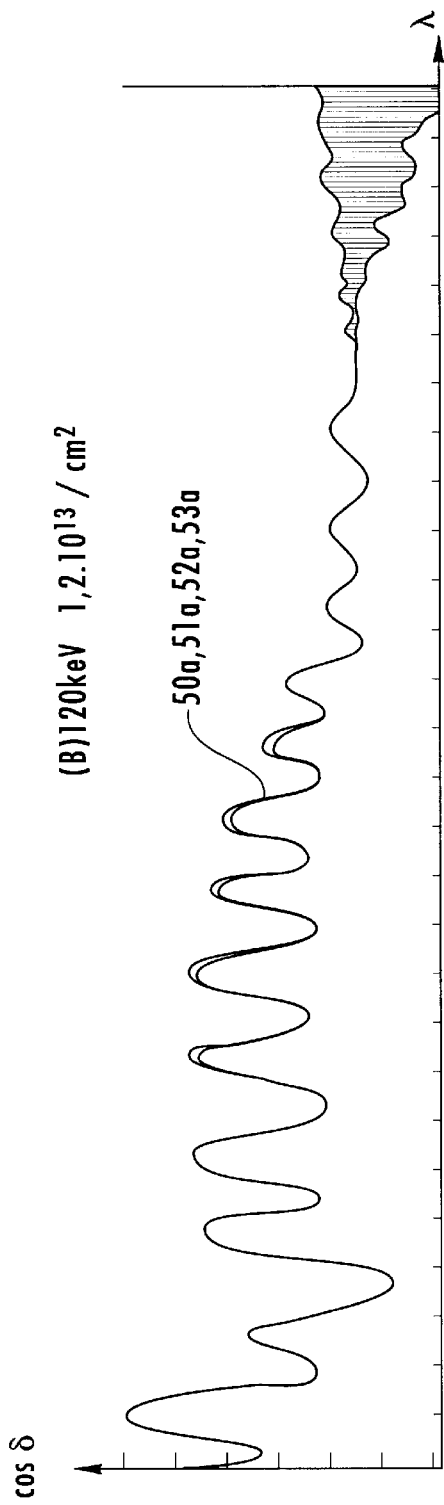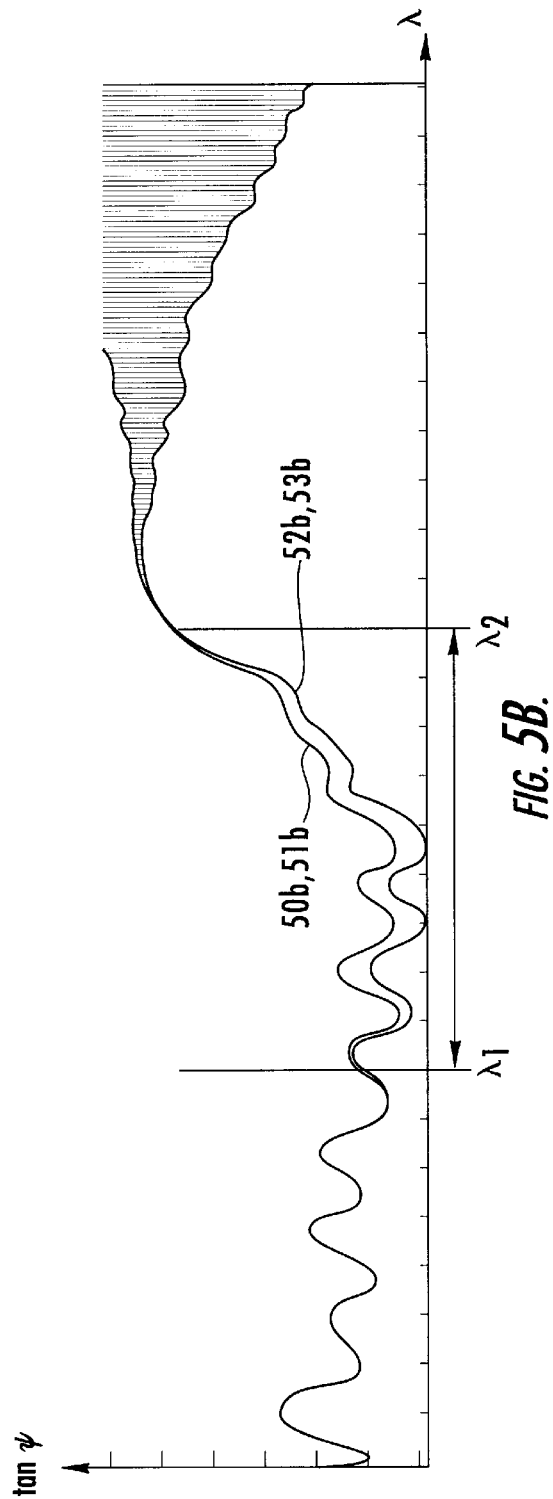

MONITORING METHOD OF AN ION IMPLANTATION PROCESS

FIELD OF THE INVENTION

The present invention relates to integrated circuit manufacturing, and, more particularly, to a control of a method for ion implantation of silicon wafers.

BACKGROUND OF THE INVENTION

Generally, the manufacture of integrated circuits is based on various techniques such as the diffusion of impurities, the growth of silicon by epitaxy, and ion implantation. As illustrated schematically in FIG. 1, ion implantation is performed by an implantation machine 1 used for the introduction, by ion bombardment, into monocrystalline silicon wafers 2, of dopant agents 3 or dopant species, such as boron, phosphorus and arsenic. These dopant agents 3 modify the electrical properties of the semiconductor silicon and enable the obtaining of P type or N type doped zones 4. These small-sized doped zones 4 are defined during the implantation by an organic resin mask 5 deposited on the surface of the silicon wafers. The combination of small-sized P doped zones and N doped zones enables the integration, on a small surface area of silicon, of a large number of elementary electronic components forming a complex electronic circuit.

In recent years, the increase in integration density and in the rates of manufacture of the integrated circuits has gone hand-in-hand with the need for increasingly stringent controls over the processes of ion implantation. Thus, the main concern of the manufacturers of integrated circuits is to swiftly detect anomalies and drifts that might appear in the implantation machines to prevent wasting silicon wafers. Indeed, a delay of a few hours in the detection of an anomaly may lead to a loss of several tens or even several hundreds of silicon wafers, which corresponds to a considerable lost sum.

In practice, the main parameters to be controlled in an ion implantation process are: the incident energy of the ions expressed in keV and the dose expressed in ions/cm$^2$. The energy determines the depth of penetration of the ions, in the range of some nanometers to some hundreds of nanometers. The dose, expressed in ions/cm$^2$, is the number of ions per unit of surface area received by an implanted wafer. The dose depends on the duration of the implantation cycle which, in general is chosen to be as short as possible, and the ion flow-rate which may be set by a measurement of the ion current.

Although the implantation machines are fitted with various control machines and instruments, experience shows that the efficient setting of the energy and dose parameters cannot really be verified except with an analysis of the result obtained. Thus, various control and verification methods have been developed enabling the measurement of the characteristics of the doped zone and the correction, if necessary, of the initial settings. These control and verification methods make it necessary, in certain cases, to plan for the use of test wafers. Others can be applied directly to "product wafers", namely silicon wafers containing the integrated circuits in the process of being manufactured. However, to date, none of these methods is free of drawbacks.

Thus, the measurement of the resistivity per unit of surface area of the dosed zones by metal probe tips has the drawback of being destructive. In the context of large-scale production, this method leads to a waste of several tens of silicon wafers per week. Furthermore, this method offers only average sensitivity to the energy and in practice enables only a verification of the dose.

Another standard method known as "SIMS" (secondary ion mass spectrometry) includes an analysis of the doped zones by mass spectrometry. This method requires the preliminary abrasion of the parts to be analyzed and is therefore destructive. It is furthermore slow to implement, and remains reserved for laboratory applications.

Yet another method, known as THERMAWAVE, include analyzing the temperature of a doped zone excited by a laser beam. This method requires complex and costly instrumentation. There is no general consensus about its non-destructive character, as there are some who believe that the heating of the tested zone causes an annealing of the silicon.

There is also a known method commercially distributed by the firm IONSCAN. This method is presented in an article by Jack J. Cheng and Gary R. Tripp in "Solid State Technology", November 1983. This method relies on the observation that, in the presence of ion bombardment, the organic resins of the implantation masks undergo a phenomenon of carbonization that modifies their optical properties. This phenomenon is explained by the fact that the ion bombardment prompts the splitting of the polymer chains; the expulsion of the H, O, N species; and then the evaporation of the most volatile components. The remaining carbon atoms get recrystallized in the form of graphite. In practice, this method is implemented by a test wafer comprising a glass substrate that is transparent to ultraviolet rays and is coated with a film of organic resin. The test wafer is subjected to an ion implantation cycle and an IONSCAN apparatus is used to measure the variations in the optical density of the resin, giving information on the dose and the energy.

This method has the advantage of being non-destructive as it is possible to recycle the test wafer at will by the withdrawal of the carbonized resin and the deposit of a new organic film. However, it provides only mediocre sensitivity to the dose and energy. This is so especially at high doses where there is observed a smoothing of the fluctuations of the optical density of the resin owing to excessive carbonization. To get a clear idea, the sensitivity to the dose is 0.9 for phosphorus doses of about $10^{12}$ ions/cm$^2$ and is only 0.1 for phosphorus doses of $10^{15}$ ions/cm$^2$ (giving a variation of 10% in optical density for a 100% variation of the dose). Furthermore, the test wafer made of glass is not detected by the optical detectors of the automatic loading systems for implantation machines. As a result, this method requires intervention by hand. This entails risks of deterioration of the implantation machines, especially in the event of breakage of the glass wafer.

Finally, the article by Jan Vanhellemont and Philippe Roussel, "Characterization by Spectroscopic Ellipsometry of Buried Layer Structure in Silicon formed by Ions Beam Synthesis", Materials Science and Engineering, B12 (1992), pp. 165–172, proposes characterizing of the buried layers of a silicon wafer by spectroscopic ellipsometry. Ellipsometry has theoretical foundations which are fairly old. However, it has recently seen considerable advances owing to the devising and marketing of spectroscopic ellipsometers endowed with powerful software. This enables the computation of the thickness and refraction index of the layers of a multilayer thin-layer wafer through a wideband measurement of the cosδ and tanψ ellipsometric parameters of the wafer.

A software program of this kind executes a regression algorithm that relies on a structural model of a multilayer wafer that has to be given to the machine. In practice, the application of ellipsometry to the characterizing of the buried layers of a silicon wafer for the verification of an industrial process has a disadvantage in the need to prepare a structural model of the wafer. A structural model is not feasible because of its complexity resulting from the various buried layers that may be contained in an integrated circuit.

Ultimately, the conventional methods used in industry, as well as those that are at the experimental stage are entirely or partially beset by the drawbacks just referred to, namely that they:

are inapplicable to wafers produced, are destructive, require non-recyclable test wafers, require test wafers incompatible with the automatic loading systems of the implantation machines, provide mediocre sensitivity to the dose and energy parameters in a certain range of values, and/or are all far too slow or have a high cost of implementation.

SUMMARY OF THE INVENTION

Thus, it is an object of the present invention to provide a method to control an ion implantation process that is not destructive, offers high sensitivity to the two essential parameters of dose and energy over a wide range of values of these parameters and can be implemented using recyclable test wafers.

The present invention is based upon a measurement by spectroscopic ellipsometry of the thickness and refractive index of a carbonized organic resin to enable the characterizing of a process of ion implantation. On this basis, the inventors have defined a test wafer structure and an ellipsometric model of a test wafer of this kind, and have carried out various tests for the assessment of the method. The results obtained have been beyond all expectations as regards to the sensitivity of the method to the dose and energy parameters for a wide range of values for these parameters.

Thus, the present invention provides a method to characterize a process of ion implantation comprising a step including the measurement, by a spectroscopic ellipsometer, of the ellipsometric parameters of a film of organic resin present on the surface of a wafer that has received ion bombardment, and wherein the resin film comprises at least one upper layer of carbonized or damaged resin.

According to one embodiment, the thickness of the carbonized or damaged resin layer of a test wafer or a test zone of a product wafer is measured, and the measured thickness is compared with the reference thickness.

According to one embodiment, the refractive index of the layer of carbonized resin or damaged resin of a test wafer or a test zone of a product wafer is measured, and the measured index is compared with a reference index.

Advantageously, the thickness or index of the layer of carbonized or damaged resin of the test wafer or of the test zone is determined on the basis of a reference model of a test wafer or a test zone comprising: 1) an upper layer of damaged or carbonized resin, with a reference thickness and refraction index, 2) a lower layer of intact resin, with a determined thickness and refraction index, and 3) a substrate with a determined thickness and refraction index.

Advantageously, there is provided a reference model comprising an upper layer of carbonized resin for doses implanted at a level above a threshold of carbonization of the resin or a reference model comprising an upper layer of damaged resin for doses implanted at a level below a threshold of carbonization of the resin. In the latter case, the refractive index of the upper layer of damaged resin of the reference model may be determined by the weighted sum of the refractive index of an intact resin and the refractive index of a carbonized resin.

According to one embodiment, the test wafer or the test zone comprises a substrate made of monocrystalline silicon. In practice, the present invention may be applied to the control or adjusting of the dose of ions delivered by an ion implantation machine or to the control or adjusting of the energy of implantation of the ions.

According to a particularly straightforward embodiment, the method according to the invention is applied to the controlling of a silicon wafer that could have a defect of implantation and comprises the step of the measurement, in a wide band of wavelengths, of the incident light beam of the spectroscopic ellipsometer, of the ellipsometric parameters of an organic resin film present on the surface of a reference silicon wafer. The method also includes the step of the measurement, in the wide band of wavelengths, of the ellipsometric parameters of an organic resin film present on the surface of the doubtful silicon wafer. The method includes the comparing of the two measurements, the doubtful silicon wafer being deemed effectively to have an implantation defect if there is at least one sub-band of wavelengths in which at least one of the ellipsometric parameters of the doubtful wafer diverges substantially from the corresponding parameter of the reference wafer. Preferably, the comparison of the two measurements relates to the ellipsometric parameter $\tan\delta$.

According to one embodiment, the invention can be applied to the sorting of a batch of product wafers after the appearance of dysfunctioning in an implantation machine.

BRIEF DESCRIPTION OF THE DRAWINGS

These objects, features and advantages as well as other characteristics of the present invention shall be explained in greater detail in the following description of the method according to the invention and of exemplary experimental results with reference to the appended figures, of which:

FIGS. 5A, 5B, 6A, 6B, 7A, 7B show curves of ellipsometric parameters of reference silicon wafers and curves of ellipsometric parameters of silicon wafers having an ion implantation defect.

DETAILED DESCRIPTION OF THE PREFERRED EMBODIMENTS

In general, the present invention proposes the measurement, by a spectroscopic ellipsometer, of the optical properties of a film of organic resin that has been carbonized or simply damaged by ion bombardment. This is done to characterize a process of ion implantation and, if necessary, modify the settings of an implantation machine. For the clarity of the description, the following description will be organized according to the following subheadings:

1) basic facts about spectroscopic ellipsometry,
2) application to the characterizing of a carbonized or damaged organic resin,
3) assessment and calibration of the method according to the invention,
4) the application of the method according to the invention to the setting and/or control of a process of ion implantation,
5) the advantages of the method according to the invention,
6) prospects offered by the method according to the invention, and
7) the application of the invention to the controlling of product wafers or to the sorting out of doubtful wafers.

1. Basic facts about spectroscopic ellipsometry

Figure 1:
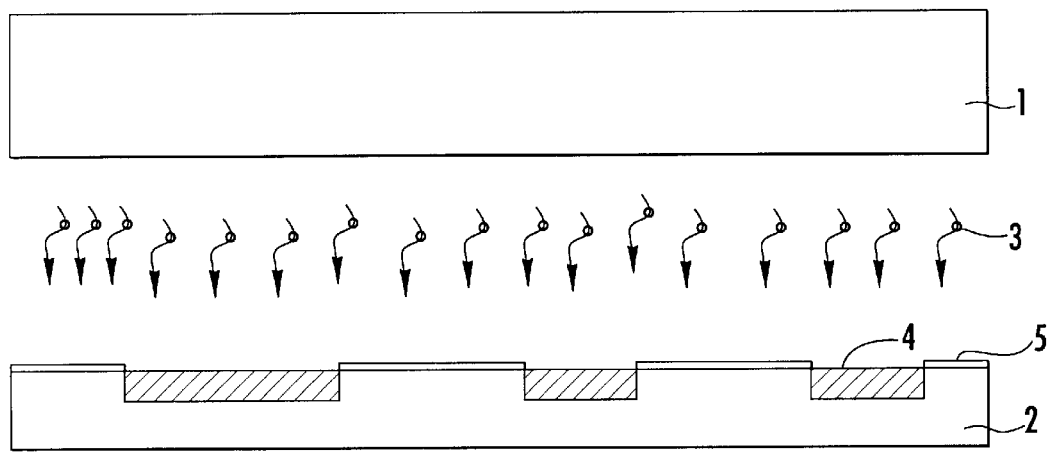
FIG. 1, which has been described here above, gives a schematic view of a process of ion implantation of a silicon wafer as in the prior art, FIG. 2 gives a schematic view of a test stand according to the invention.
Figure 2:
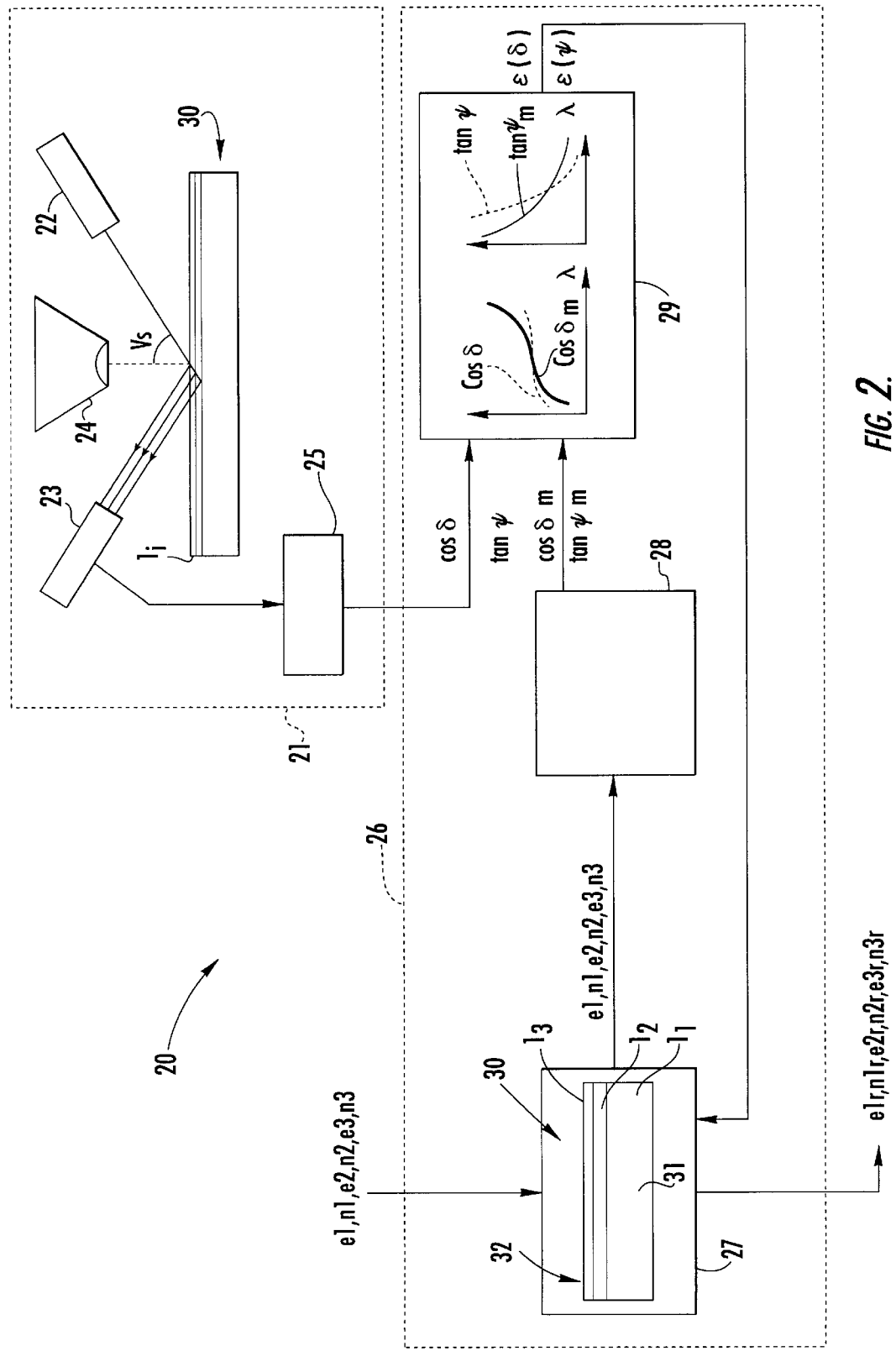

FIG. 2 gives a schematic view of the structure of a standard type of spectroscopic ellipsometer 20. The machine 20 comprises an instrumentation part 21 and a computation unit 26. The instrumentation part 21 comprises a light source 22, an analyzer 23, an alignment telescope 24 and a spectrometer 25 coupled with the analyzer 23. The source 22 delivers an incident beam of rectilinear polarized polychromatic light applied at an incident or incoming angle Vs to a wafer 30 comprising a plurality of superimposed parallel layers $l_i$ whose optical characteristics have to be determined. The ray reflected by the wafer 30, which is elliptically polarized, is received by the analyzer 23. The spectrometer 25 delivers the standard ellipsometric parameters $\tan\psi$ and $\cos\delta$ of the reflected ray for several wavelengths $\lambda$ of the incident beam and sends them to the computation unit 26. As a reminder, these parameters are governed by the following relationship (1) expressed in the plane of the complex numbers and applicable to isotropic materials:

$$\tan\psi \exp(i\delta) = r_p/r_s \quad (1)$$

the angle $\psi$ being a function of the modulus of the reflected wave and the angle $\delta$ being a function of the phase shift of the two components of the electrical field of the reflected wave. And $r_p$ and $r_s$ are the complex reflection coefficients of the incident beam on the wafer 30.

The computation unit 26 comprises a software program executing a regression algorithm whose functions are represented symbolically by three blocks 27, 28, 29. This algorithm is used for the definition, by successive approximations, of the thicknesses $e_i$ and the complex refractive indices $n_i$ of each of the layers $l_i$ of the wafer 30 to be studied. First of all, the block 27 is given the thicknesses $e_i$ and the estimated indices $n_i$ of the various layers $l_i$, the whole set forming a structural model of the wafer 30. The block 28 computes the theoretical ellipsometric parameters $\tan\psi m$ and $\cos\delta m$ of the model on a wide range of wavelengths $\lambda$, on the basis of the data elements $e_i$ and $n_i$. The block 29 compares the theoretical parameters $\tan\psi m$, $\cos\delta m$ with the real parameters $\tan\psi$, $\cos\delta$ measured by the instrumentation part 21 and delivers an error signal $\epsilon\delta$ on the angle $\delta$ and an error signal $\epsilon\psi$ on the angle $\psi$. From these error signals, the block 27 determines new thickness values $e_i$ and index values $n_i$. The operation is repeated until the curve of the theoretical parameters $\tan\psi m$ and $\cos\delta m$ correspond substantially and preferably exactly to the curve of the measured parameters $\tan\psi$, $\cos\delta$.

2. Application to the characterizing of a carbonized or damaged organic resin

According to the invention, it is proposed to use the spectroscopic ellipsometer that has just been described to analyze a test wafer 30 comprising a substrate 31 coated with a film of organic resin 32 that has been subjected to an ion implantation cycle.

As we have seen above, an analysis of this kind is possible only with reference to a model which must be given to the computation unit 26, jointly with a concrete measurement of the ellipsometric parameters $\tan\psi$ and $\cos\delta$ of the test wafer 30. Thus, according to the invention, a choice is made first of all of a test wafer model comprising:

1) a lower layer $l_1$ formed by the substrate 31, with a thickness $e_1$ and a refractive index $n_1$,
2) an intermediate layer $l_2$ of intact organic resin with a thickness $e_2$ and a refractive index $n_2$, and
3) an upper layer $l_3$ of carbonized or damaged organic resin, with a thickness $e_3$ and a refractive index $n_3$ (see FIG. 2, block 27).

Preferably, it is assumed that the upper layer $l_3$ is formed by carbonized resin or damaged resin according to whether the dose D is greater than or smaller than the threshold Dmin. It is known that this threshold is generally $10^{14}$ ions/cm$^2$. Should the upper layer be simply damaged, the initial value of the index $n_3$ that has to be given to the computation unit 26 may be chosen by taking the weighted sum of the index of the carbonized resin and the index of the intact resin. The weighting coefficients are chosen first of all arbitrarily. Then they are refined by the computation unit 26.

Then, test wafers are made out of a substrate 31 made from monocrystalline silicon with a thickness of several tenths of millimeters. On this substrate, a film 32 of organic resin is deposited, for example with a thickness of about 1.1 micrometers. These test wafers will be used initially to assess the method according to the invention and then, secondly, to adjust or control implantation machines.

3. Assessment and calibration of the method according to the invention

This preliminary step is important or essential, in practice, to set the parameters of the method. This step has furthermore made it possible to verify that a measurement of the thickness of the carbonized or damaged layer of a film of organic resin gives information on the parameters of energy and dose that is capable of being industrially exploited for the control and adjustment of the implantation machines.

This step includes determining, for several pairs of values of the energy parameter E and the dose parameter D, the thickness of the layer $l_3$ of carbonized or damaged resin, on the basis of the reference test wafers that have undergone ion implantation cycles in a properly set implantation machine. Table 1 gives a description, with reference to FIG. 2, of the various steps used, for a pair of values E and D, to obtain three values of thickness $e_{1r}$, $e_{2r}$ and $e_{3r}$ and three refractive index values $n_{1r}$, $n_{2r}$ and $n_{3r}$ defining a reference test wafer model. The steps described in Table 1 are repeated for several pairs of values E, D until the obtaining of a set of models of reference test wafers. On the basis of this it is possible to plot curves of the type shown in FIGS. 3 and 4.

Figure 3:
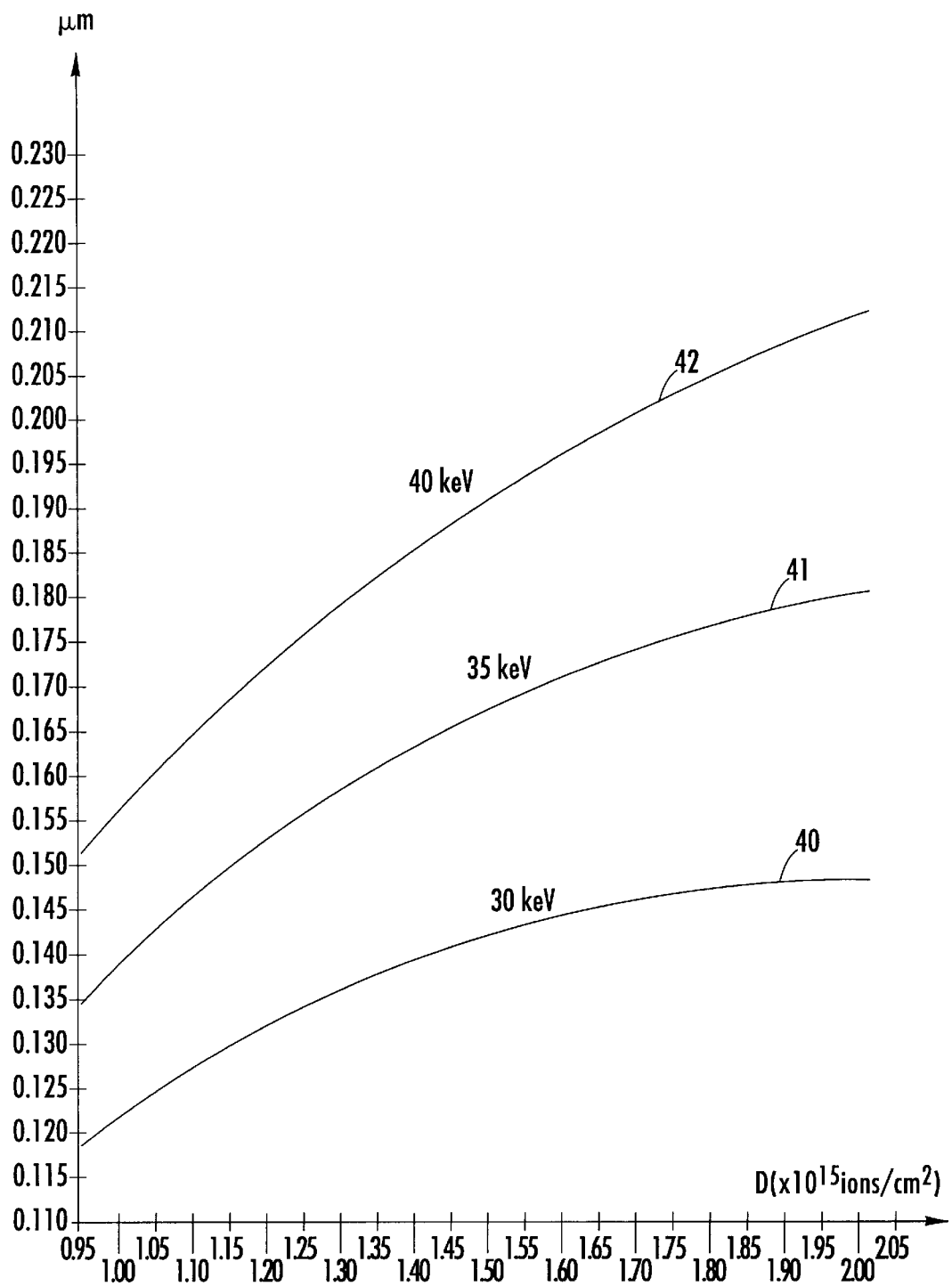
FIG. 3 shows curves giving the thickness of a layer of organic resin that is carbonized or damaged as a function of the implantation energy.
Figure 4:
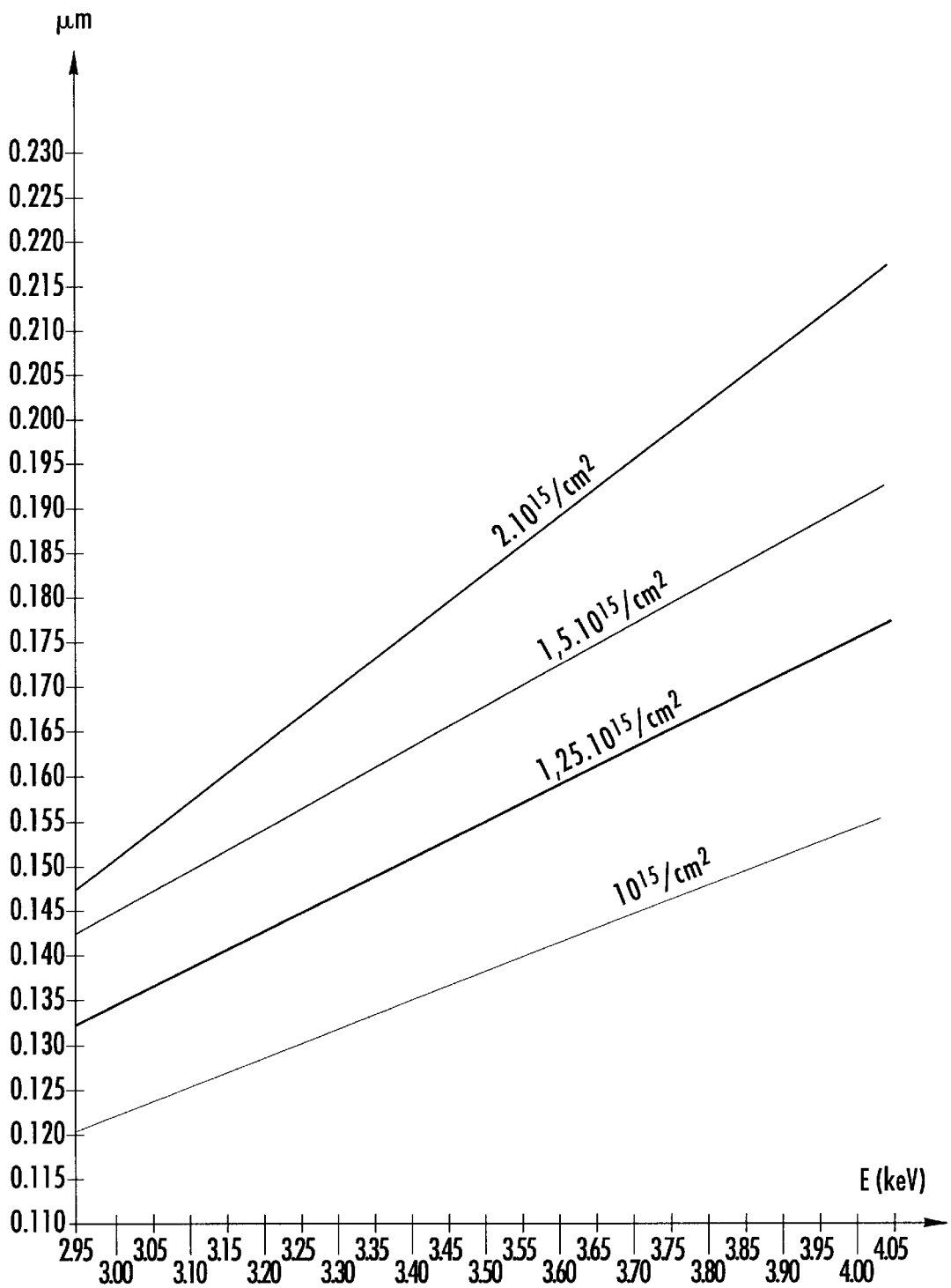
FIG. 4 shows curves giving the thickness of a layer of carbonized or damaged organic resin as a function of the implanted dose.

To get a clearer picture, FIGS. 3 and 4 provide a schematic illustration of the results of assessment of the method for an implantation of boron achieved by means of an HIPR6512 type organic resin commercially distributed by the firm OLIN and a spectroscopic ellipsometer of the SOPRA make. FIG. 3 shows curves 40, 41, 42, giving the thickness $e_3$ of carbonized resin as a function of the dose D for implantation energy values of 30, 35 and 40 keV respectively. These curves have a regular and proportional profile which shows that the thickness of the carbonized resin computed by spectroscopic ellipsometry is a reliable parameter for assessing the dose D. Furthermore, FIG. 4 shows curves 43, 44, 45, 46 giving the thickness $e_3$ of carbonized resin as a function of the energy E, for doses of $10^{15}$, $1.25 \ 10^{15}$ and $1.5 \ 10^{15}$ and $2 \ 10^{15}$ ions/cm$^2$ respectively. The regular and proportional profile of these curves shows that the thickness of carbonized resin is also a reliable parameter for controlling the energy E of ion implantation.

Naturally, the digital values given by FIGS. 3 and 4 are not absolute and depend on the structural model chosen which can take many alternative forms. Thus, for example, for doses greater than $10^{14}$ ions/cm$^2$, it is possible to choose a model with four layers comprising: the substrate 31, a deep layer of undamaged resin, an intermediate layer of damaged resin and an upper layer of carbonized resin. With a model of this kind, the computed values of the thickness of the carbonized layer would be different. However, the three-layer model chosen appears to be fully satisfactory in that, after several iterations, it has made it possible to obtain the coinciding of the theoretical ellipsometric parameters tan$\psi$m, cos$\delta$m of the model with the measured parameters tan$\psi$, cos$\delta$ throughout the range of wavelengths $\lambda$ offered by the spectroscopic ellipsometer.

Finally, the choice of a substrate 31 made of monocrystalline silicon is also not imperative. The substrate could, for example, be made of ceramic and coated with a thin layer of metallization making it possible to reflect the polarized light beam. The deposition of a metallization on a silicon substrate may also be envisioned.

4. Application of the method according to the invention to the setting and/or control of a process of ion implantation Now that the method has been assessed and calibrated for various dopant species and various energy/dose pairs, it will be possible to apply it to the setting and control of an implantation machine. It might be recalled here that the setting of an implantation machine is necessary when starting the manufacture of a new batch of product wafers when the parameters E and D are modified. Once adjusted, the machine must be controlled regularly to detect a possible drift of these parameters.

The invention now uses one or more test wafers of the same structure as the reference test wafers. An ion implantation cycle is applied to these test wafers. In practice, the duration of the implantation cycles amounts to only a few minutes. Furthermore, the test wafers can be recycled because the carbonized organic resin can be removed by a solvent, an acid, or a plasma etching machine. The method is therefore fast and relatively inexpensive.

Table 2 summarizes the various steps of the method up to the determining of the thickness $e_{3t}$ of the layer of carbonized resin. Here, all that is defined is a new wafer model, but the computation unit 26 is given the thicknesses $e_{1r}$, $e_{2r}$, $e_{3r}$ and the indexes $n_{1r}$, $n_{2r}$, $n_{3r}$ of the layers $l_1$, $l_2$, $l_3$ of the closest reference test wafer model, chosen as a function of the parameters E and D to be adjusted or controlled. The thickness $e_{1r}$ of the substrate 31 is considered to be infinite and the indices $n_{1r}$ of the substrate and $n_{2r}$ of the intact resin are considered to be invariant. The computation unit 26 brings about a change, by iteration, of the parameters $n_{3r}$, $e_{2r}$, $e_{3r}$ on the basis of an actual measurement of the ellipsometric parameters tan$\psi$t, cos$\delta$t of the test wafer. This actual measurement is preferably made on the entire range of wavelengths $\lambda$ offered by the spectroscopic ellipsometer 20.

Furthermore, Table 2 shows two alternative variants are possible. According to variant 1, a computation is made of both the thickness $e_{3t}$ and the index $n_{3t}$ of the layer of carbonized resin of the test wafer. According to the variant 2, it is assumed that the index $n_{3t}$ is constant and only the thickness $e_{3t}$ is determined. The measured thickness in this case is a "pseudo-thickness," but this approximation may prove to be sufficient to detect a drift of the ion implantation process or to obtain the desired setting. Once the thickness or the pseudo-thickness $e_{3t}$ is determined, it is compared with the reference value $e_{3r}$ (it is also possible to refer to the calibration curves) to estimate the corrections to be made to the settings of the energy E of the dose D. It is also possible to work on the basis of the index $n_{3t}$ and compare it with the reference index $n_{3r}$.

5. Advantages of the method according to the invention

Initially, and for practical reasons, the method was performed with a spectroscopic ellipsometer bearing the reference SOPRA-OMA that provides only for a measurement of the pseudo-thickness $e_{3t}$ of carbonized resin. More recently, assessment trials have been conducted with a more advanced spectroscopic ellipsometer bearing the reference SOPRA-SCANNING that enables the measurement of both the thickness $e_{3t}$ and the index $n_{3t}$ of the carbonized resin. Table 3 summarizes the results obtained in terms of sensitivity to dose and compares the method of the invention with two other conventional methods. It can be seen that, with a high-quality spectroscopic ellipsometer, it is possible to obtain excellent sensitivity to low doses and, on an average, high sensitivity over a wide range of values of the dose. Furthermore, the method of the invention is not destructive and can be implemented by means of recyclable test wafers.

6. Prospects offered by the method according to the invention

In general and in the current state of his knowledge and experiments, the inventor is of the view that the method of the invention is a potentially powerful, low-cost, high-speed approach to controlling an ion implantation process. It is also a method which, by itself, covers all the measurements usually made with two or three conventional methods. Furthermore, the possibility of determining both the thickness $e_{3t}$ and the index $n_{3t}$ of the layer of carbonized or damaged resin of a test wafer enables the separate assessment of the two parameters of dose and energy. Indeed, the experiments have shown that a variation of the dose acts essentially on the index $n_{3t}$, while a variation of the energy acts essentially on the thickness $e_{3t}$. The method is not limited to an assessment of the pseudo-thickness. The totalling of the two measurements makes it possible to control the parameters of energy and dose separately. It must be noted here that the inventor believes, without wishing to be bound thereto, that a control of the energy is aimed at detecting an abnormal dispersion of the incident energy of the ions which should have repercussions on the thickness or the index of the carbonized or damaged resin layer rather than at detecting the total energy of implantation. The total energy of implantation is generally well controlled with present-day implantation machines and unlikely to be subject to fluctuations.

Furthermore, another parameter of an ion implantation process that is desirably also monitored is the neutralization of the electrical charges brought in by the ion bombardment. Conventionally, the neutralization of the electrical charges is provided by a shower of electrons applied to the silicon wafers during the implantation. A dysfunctioning of the electron shower leads to an accumulation of charges, known as "wafer charging", which may seriously damage electronic components made in the course of the previous steps. To date, a dysfunctioning of the electron shower is observed only at the final stage of manufacture, during the controlling of the electrical characteristics of the integrated circuit.

Now, subject to further studies, the inventor also believes, without wishing to be bound thereto, that abnormal wafer charging should affect the process of carbonization of an organic resin and have repercussions on the index $n_{3t}$ of the carbonized layer. Thus, the method of the invention is also capable of being used to detect abnormal wafer charging during the ion bombardment.

7. Application of the invention to the controlling of product wafers or to the sorting of doubtful wafers In addition to the control and setting of an ion implantation machine, the present invention can also be applied to the controlling of wafers produced during manufacture. In this case, a testing zone with a small surface area is provided on the wafers produced. The testing zone preferably has the same structure as the test wafer described further above, and is laid out at a dedicated place of the product wafers, for example, in a zone for the separation of integrated circuits manufactured in a joined state. This test zone, for which the ellipsometric model has been previously determined, enables the verification of the fact that a product wafer has undergone satisfactory ion implantation.

A verification of this kind is an alternative or a complement to the use of test wafers and may be performed, for example, during the period between two controls done by test wafers. Finally, like the test wafers, the test zone may be regenerated by the removal of the carbonized resin and the application of a new film of organic resin.

A description shall now be given of a simple and advantageous application of the present invention enabling a sorting of doubtful silicon wafers by a simple comparative measurement of ellipsometric parameters. In practice, a sorting of this kind proves to be necessary when a dysfunctioning of an implantation machine is detected without the exact time of its appearance being known. In this case, there is indeed available a batch of doubtful wafers including sound wafers and faulty wafers, the faulty wafers generally being wafers without implantation because of dysfunctioning. The present invention is based herein on the observation that a simple comparison of the ellipsometric parameters tanψ and cosδ of organic resin of an ion implantation mask, made on a wide band of wavelengths λ, may make it possible to distinguish between implanted wafers and non-implanted wafers.

By way of an example, FIGS. 5A and 5B, respectively, show the curves 50a to 53a and 50b to 53b of the parameters cosδ and tanψ of a batch of doubtful silicon wafers comprising two wafers implanted with boron at 120 keV and 1.2 $10^{13}$ ions/cm² and two non-implanted wafers. The curves of FIG. 5A are practically merged and do not make it possible to distinguish the non-implanted wafers from the implanted wafers. By contrast, FIG. 5B shows a window λ1–λ2 of wavelengths in which the curves 52b, 53b of the non-implanted wafers are clearly distinguished from the curves 50b, 51b of the implanted wafers. A window of this kind is sufficient, in practice, to eliminate the non-implanted wafers. In the figures, the hatched zones correspond to noise zones where the measurement does not enable the plotting of a smooth and homogeneous curve.

Figure 6A:
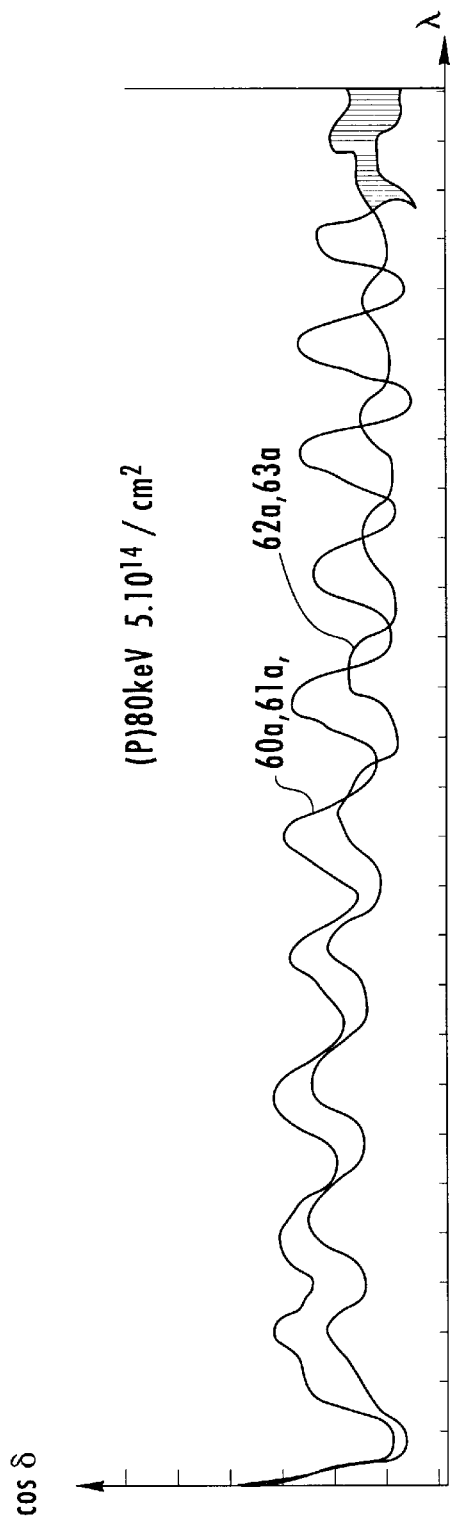
Figure 6B:
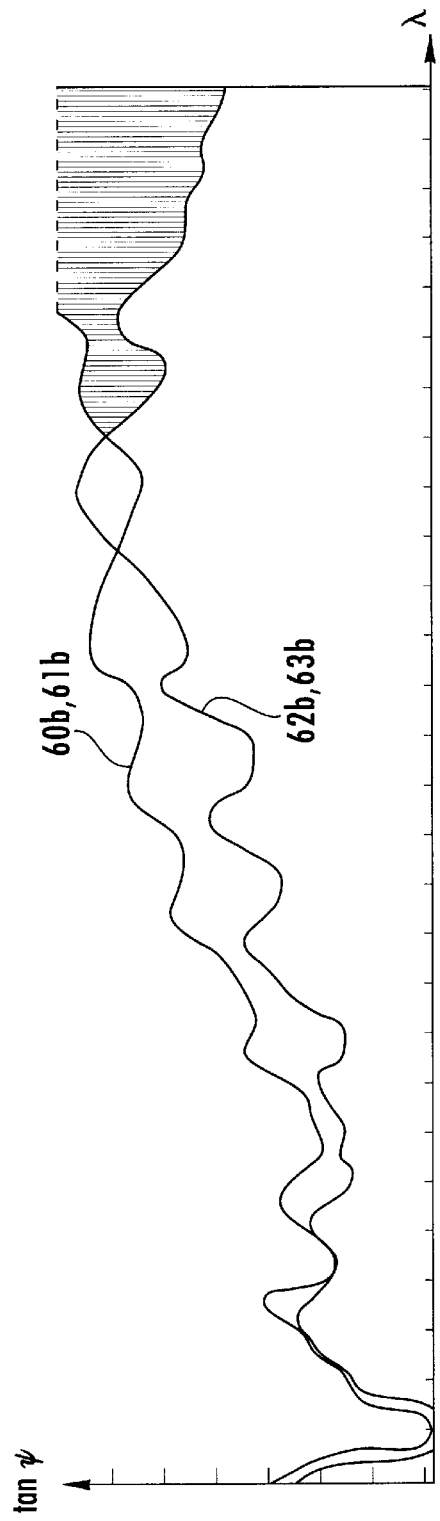

Another example is shown in FIGS. 6A, 6B, which respectively show the curves 60a to 63a and 60b to 63b of the parameters cosδ and tanψ of a batch of doubtful wafers comprising two wafers implanted with phosphorus at 80 keV and 5 $10^{14}$ ions/cm² and two non-implanted wafers. Here, in the two FIGS. 6A, 6B, the curves 62 and 63 of the non-implanted wafers can be clearly distinguished from the curves 60 and 61 of the implanted wafers.

Figure 7A:
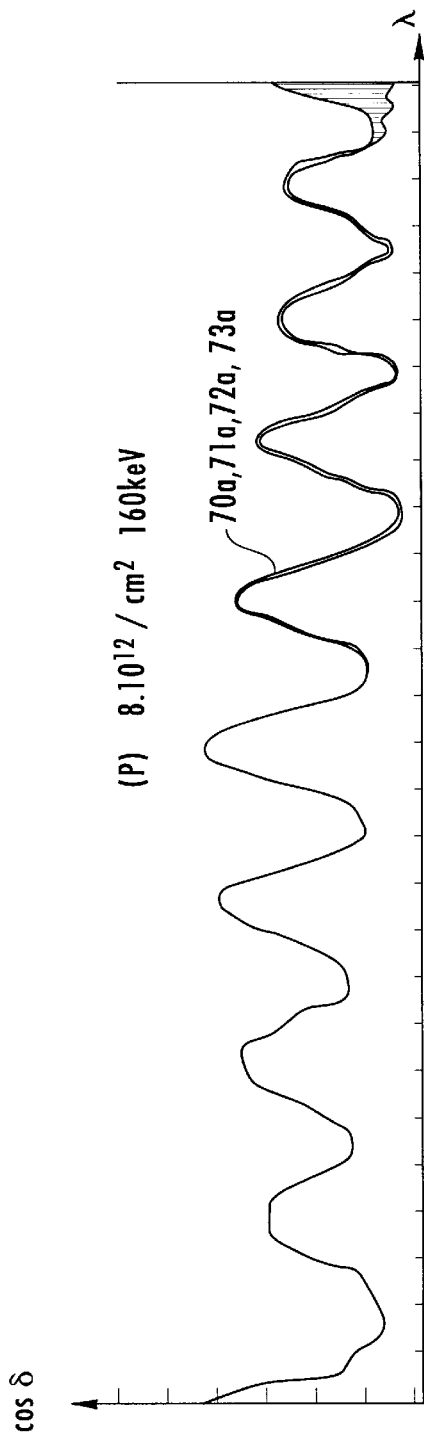
Figure 7B:
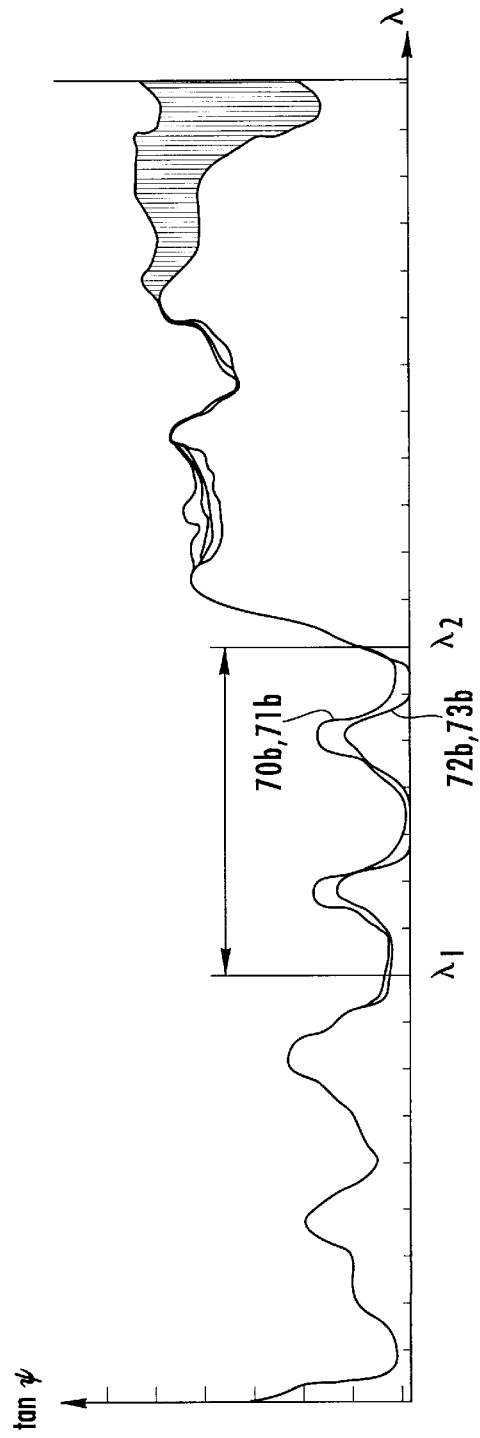

As other examples, FIGS. 7A, 7B, respectively, show the curves 70a to 73a and 70b to 73b of the parameters cosδ and tanψ of a batch of doubtful wafers comprising two wafers implanted with a small phosphorus dose of 8 $10^{12}$ ions/cm² and an energy value of 160 keV and two non-implanted wafers. Although these various curves are practically merged owing to the small dose implanted, it can nevertheless be seen in FIG. 7B that there remains a window λ1–λ2 in which the curves 72b, 73b of the non-implanted wafers are distinguished from the curves 70b, 71b of the implanted wafers.

It can therefore be seen that a simple comparative measurement of the ellipsometric parameters cosδ and tanψ of the organic resin implantation masks, made on a range of wavelengths going substantially from the infrared to the ultraviolet, enables the sorting of the doubtful silicon wafers with reference to a silicon wafer deemed to be sound. The method is simple, and direct and does not require any prior calibration nor the preparation of a structural model. Furthermore, since the method is purely comparative, it is not indispensable to set aside a test zone. It is quite clear however that the ellipsometric parameters must be measured at one and the same point of the product wafers.

Finally, and contrary to all expectations, the above examples show that this method can be applied to wafers implanted in small doses. Ultimately, this aspect of the invention enables the recovery, at the production stage, of a batch of doubtful wafers designed for the destruction of viable wafers that have been implanted before the appearance of dysfunctioning. This method has already enabled the assignee of the present invention to save dozens of product wafers and make substantial savings in the manufacture of integrated circuits. In general, this method can be applied to the sorting of manufactured wafers having implantation defects inasmuch as such defects have repercussions on the ellipsometric parameters.

TABLE 1

The characterizing of a test wafer model

| Preparatory steps | Steps for the characterizing of the model |
|---|---|
| Step 1.1 | Step 1.4 |
| Choice of E (energy in keV) Choice of D (dose in ions/cm²) | Measurement of the parameters tanψ cosδ of the reference test wafer |
| Step 1.2 | Step 1.5 |
| Choice of an initial structural model of a test wafer having a substrate and a film of organic resin comprising a layer of carbonized or damaged resin and a layer of intact resin | Computation of the theoretical parameters tanψm and cosδm of the model (block 28) |
| Step 1.3 | Step 1.6 |
| Providing the computation unit 26 (block 27) with the initial values of thicknesses e, $e_2$, $e_2$ and indices $n_1$, $n_2$, $n_2$ of the initial model | Computation of the errors e(ψ) and e(δ) between the parameters tanψm and cosδm of the model and the measured parameters tanψ cosδ of the reference test wafer (block 29) |
| Step 1.3 | Step 1.7 |

TABLE 1-continued

The characterizing of a test wafer model

| Preparatory steps | Steps for the characterizing of the model |
|---|---|
| Applying an ion implantation cycle to a test wafer by means of a reference implantation machine for the values of E and D chosen | Correction of the test wafer model (block 27) Repetition of the steps 1.5 to 1.7 (iteration) |

Step 1.8

Obtaining of a definitive model of a reference test wafer: thicknesses $e_{1r}$, $e_{2r}$, $e_{3r}$, indices: $n_{1r}$, $n_{2r}$, $n_{3r}$ such that $\cos\delta m = \cos\delta$ and $\tan\psi = \tan\psi$

TABLE 2

Setting or control of an implantation machine

Initial setting of the machine: E and D

Application of an ion implantation cycle to the test wafer
Actual measurement of the parameters $\tan\psi t$, $\cos\delta t$ of the test wafer
Modeling of the test wafer by comparison with the closest reference test wafer model chosen as a function of the values of E and D to be controlled or adjusted

| (variant 1) | (variant 2) |
|---|---|
| Determining of the thickness $e_{3t}$ and the index $n_{3t}$ of the layer of carbonized resin | Determining of the pseudo-thickness $e_{3t}$ of the layer of carbonized resin with $n_{3t} = n_{3r\_cte}$ |
| Computation of the variation $\Delta e = e_{3t} - e_{3r}$ computation of the variation $\Delta n = n_{3t} - n_{3r}$ | Computation of the pseudo-variation with a thickness $\Delta e = e^{3t} - e^{3r}$ |

Correction of the setting of E and/or correction of the setting of D

TABLE 3

Mean sensitivity of the dose

| Method | Dopant species | Sensitivity (doses of $10^{12}$ to $10^{13}$ ions/cm$^2$) | Sensitivity (doses of $10^{15}$ ions/cm$^2$) |
|---|---|---|---|
| resistivity per unit of area | boron | 0.6 | 0.9 |
|  | phosphorus | 0.7 | 0.8 |
| IONSCAN method | boron | 0.9 | 0.4 |
|  | phosphorus | 0.9 | 0.1 |
| SOPRA OMA | boron | 0.7 | 0.4 |
|  | phosphorus | 0.7 | 0.3 |
| SOPRA SCANNING | boron | 1.6 | —* |
|  | phosphorus | 4.5 | —* |

(*Undetermined)

What is claimed is:

1. A method to designate a process of ion implantation comprising the step of:
    measuring, by a spectroscopic ellipsometer, of at least one ellipsometric parameters of a film of organic resin on a surface of a wafer that has received ion implantation, the resin film comprising at least one upper layer of carbonized or damaged resin.

2. A method according to claim 1, wherein the measuring is performed on at least one of a test wafer and a test zone of a product wafer.

3. A method according to claim 2, wherein the at least one of the test wafer and the test zone comprises a monocrystalline silicon substrate.

4. A method according to claim 1, wherein a thickness of the at least one upper layer of carbonized or damaged resin is measured; and further comprising the step of comparing the measured thickness with a reference thickness.

5. A method according to claim 1, wherein a refractive index of the at least one upper layer of carbonized or damaged resin is measured; and further comprising the step of comparing the measured refractive index with a reference refractive index.

6. A method according to claim 1, wherein a thickness of the at least one upper layer of carbonized or damaged resin is determined from a reference model comprising an upper layer of carbonized or damaged resin with a reference thickness, a lower layer of intact resin with a determined thickness, and a substrate with a determined thickness.

7. A method according to claim 6, wherein for doses implanted at a level above a threshold of carbonization of the resin, there is provided a reference model comprising an upper layer of carbonized resin.

8. A method according to claim 6, wherein for doses implanted at a level below a threshold of carbonization of the resin, there is provided a reference model comprising an upper layer of damaged resin.

9. A method according to claim 1, wherein a refractive index of the at least one upper layer of carbonized or damaged resin is determined from a reference model comprising an upper layer of carbonized or damaged resin with a reference refractive index, a lower layer of intact resin with a determined refractive index, and a substrate with a determined refractive index.

10. A method according to claim 9, wherein for doses implanted at a level above a threshold of carbonization of the resin, there is provided a reference model comprising an upper layer of carbonized resin.

11. A method according to claim 9, wherein for doses implanted at a level below a threshold of carbonization of the resin, there is provided a reference model comprising an upper layer of damaged resin.

12. A method according to claim 11, wherein a refractive index of the upper layer of damaged resin of the reference model is determined by a weighted sum of a refractive index of an intact resin and a refractive index of a carbonized resin.

13. A method for controlling or adjusting an ion implantation delivered by an ion implantation machine, the method comprising the steps of:
    designating a process of ion implantation by measuring, by a spectroscopic ellipsometer, of at least one ellipsometric parameters of a film of organic resin on a surface of a wafer that has received ion implantation, the resin film comprising at least one upper layer of carbonized or damaged resin; and
    controlling or adjusting at least one of a dose of ions delivered by the ion implantation machine and an ion implantation energy of the ion implantation machine based upon the step of designating.

14. A method according to claim 13, wherein the measuring is performed on at least one of a test wafer and a test zone of a product wafer.

15. A method according to claim 14, wherein the at least one of the test wafer and the test zone comprises a monocrystalline silicon substrate.

16. A method according to claim 13, wherein a thickness of the at least one upper layer of carbonized or damaged resin is measured; and further comprising the step of comparing the measured thickness with a reference thickness.

17. A method according to claim 13, wherein a refractive index of the at least one upper layer of carbonized or damaged resin is measured; and further comprising the step of comparing the measured refractive index with a reference refractive index.

18. A method according to claim 13, wherein a thickness of the at least one upper layer of carbonized or damaged resin is determined from a reference model comprising an upper layer of carbonized or damaged resin with a reference thickness, a lower layer of intact resin with a determined thickness, and a substrate with a determined thickness.

19. A method according to claim 18, wherein for doses implanted at a level above a threshold of carbonization of the resin, there is provided a reference model comprising an upper layer of carbonized resin.

20. A method according to claim 18, wherein for doses implanted at a level below a threshold of carbonization of the resin, there is provided a reference model comprising an upper layer of damaged resin.

21. A method according to claim 13, wherein a refractive index of the at least one upper layer of carbonized or damaged resin is determined from a reference model comprising an upper layer of carbonized or damaged resin with a reference refractive index, a lower layer of intact resin with a determined refractive index, and a substrate with a determined refractive index.

22. A method according to claim 21, wherein for doses implanted at a level above a threshold of carbonization of the resin, there is provided a reference model comprising an upper layer of carbonized resin.

23. A method according to claim 21, wherein for doses implanted at a level below a threshold of carbonization of the resin, there is provided a reference model comprising an upper layer of damaged resin.

24. A method according to claim 23, wherein a refractive index of the upper layer of damaged resin of the reference model is determined by a weighted sum of a refractive index of an intact resin and a refractive index of a carbonized resin.

25. A method for identifying a potentially defective wafer comprising the steps of:
  measuring in a wide band of wavelengths of at least one ellipsometric parameter of a resin film on a surface of a reference wafer;
  measuring in the wide band of wavelengths of at least one ellipsometric parameter of a resin film on a surface of a potentially defective wafer; and
  comparing the two measurements to determine that the potentially defective wafer has an implantation defect based upon at least one sub-band of wavelengths in which at least one ellipsometric parameter of the potentially defective wafer diverges substantially from a corresponding parameter of the reference wafer.

26. A method according to claim 25, wherein the potentially defective wafer comprises a silicon wafer, and the reference wafer comprises a silicon wafer.

27. A method according to claim 25, wherein the step of comparing comprises comparing two measurements relating to an ellipsometric parameter tan $\delta$.

28. A method according to claim 25, wherein the wide band of wavelengths comprises a plurality of sub-bands of wavelengths.

29. A method for sorting a batch of product wafers after an appearance of dysfunctioning in an implantation machine, the method comprising the steps of:
  identifying a potentially defective wafer from the batch of product wafers by
    measuring in a wide band of wavelengths of at least one ellipsometric parameter of a resin film on a surface of a reference wafer,
    measuring in the wide band of wavelengths of at least one ellipsometric parameter of a resin film on a surface of a potentially defective wafer, and
    comparing the two measurements to determine that the potentially defective wafer has an implantation defect based upon at least one sub-band of wavelengths in which at least one ellipsometric parameter of the potentially defective wafer diverges substantially from a corresponding parameter of the reference wafer; and
  removing each defective wafer from the batch of product wafers.

30. A method according to claim 29, wherein the potentially defective wafer comprises a silicon wafer, and the reference wafer comprises a silicon wafer.

31. A method according to claim 29, wherein the step of comparing comprises comparing two measurements relating to an ellipsometric parameter tan$\delta$.

32. A method according to claim 29, wherein the wide band of wavelengths comprises a plurality of sub-bands of wavelengths.

* * * * *

UNITED STATES PATENT AND TRADEMARK OFFICE
CERTIFICATE OF CORRECTION

PATENT NO. : 6,141,103
DATED : October 31, 2000
INVENTOR(S) : Jacques Pinaton, Olivier Diop, Pascal Lambert Page 1 of 2

It is certified that error appears in the above-identified patent and that said Letters Patent is hereby corrected as shown below:

Drawings, Fig. 4      Insert:

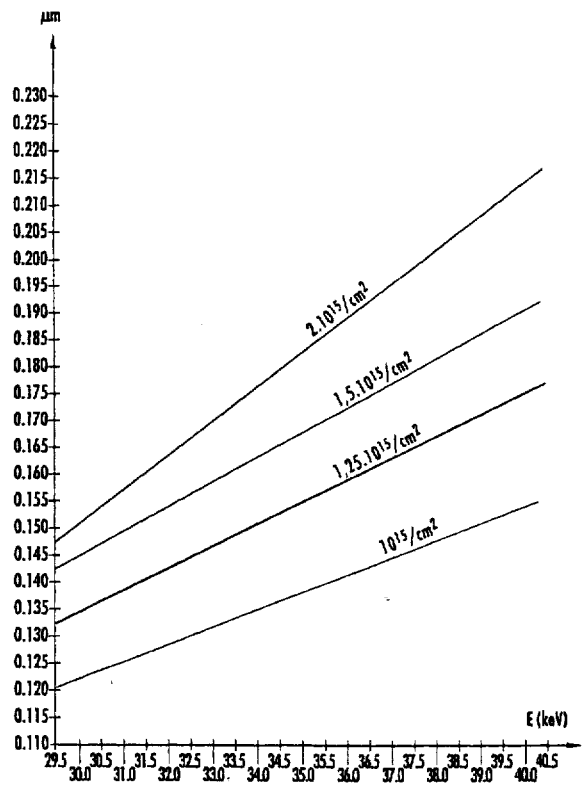

FIG. 4.

Column 10, Line 60      Delete "e"
Insert --$e_1$--

UNITED STATES PATENT AND TRADEMARK OFFICE
CERTIFICATE OF CORRECTION

PATENT NO. : 6,141,103
DATED : October 31, 2000
INVENTOR(S) : Jacques Pinaton, Olivier Diop, Pascal Lambert It is certified that error appears in the above-identified patent and that said Letters Patent is hereby corrected as shown below:

Column 11, Line 17  Delete "and tan$\psi$ =" 
Insert --and tan$\psi$m = --

Claim 27, Line 14   Delete "tan 6" 
Insert --tan$\delta$--

Signed and Sealed this

Eighth Day of May, 2001

*Attest:*

NICHOLAS P. GODICI

*Attesting Officer*    *Acting Director of the United States Patent and Trademark Office*